(12) United States Patent
Aramaki

(10) Patent No.: US 6,370,134 B1
(45) Date of Patent: Apr. 9, 2002

(54) CDMA RADIO COMMUNICATION APPARATUS

(75) Inventor: Yoshitaka Aramaki, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/115,502

(22) Filed: Jul. 15, 1998

(30) Foreign Application Priority Data

Jul. 17, 1997 (JP) .............................................. 9-207407

(51) Int. Cl.$^7$ .............................................. H04B 7/216
(52) U.S. Cl. ........................ 370/342; 370/335; 370/320
(58) Field of Search ................................ 370/320, 335, 370/342, 441, 350, 503, 509

(56) References Cited

U.S. PATENT DOCUMENTS 6,167,037 A * 12/2000 Higuchi et al. ............. 370/335

OTHER PUBLICATIONS

An article by Higuchi et al., entitled "Two-Stage Rapid Long Code Acquisition Scheme in DS–CDMA Asynchronous Cellular System", published by NTT Mobile Communications Network Inc., with an English Language abstract.
English Language Abstract of JP 11–8607.
Article by HIGUGHI et al., entitled "Two Stage Rapid Cell Search Scheme in DS–CDMA Asynchronous Cellular System using Long Code", published by NTT Mobile Communications Network Inc., pp. 51–56, along with an English language translation of its relevant portion.
Article by HIGUCHI et al., entitled "Fast Cell Search Algorithm using Long Code Masking in DS–CDMA Asynchronous Cellular System", published by NTT Mobile Communications Network Inc., pp. 57–63, along with an English language translation of its relevant portion.

* cited by examiner

*Primary Examiner*—Wellington Chin
*Assistant Examiner*—Brenda H. Pham
(74) *Attorney, Agent, or Firm*—Greenblum & Bernstein P.L.C.

(57) ABSTRACT

A transmission side transmits a frame in which a masked symbol spread with a common short code to all base stations is prepared at equal intervals and a symbol spread with a long code group identification is multiplexed in the masked symbol according to the predetermined pattern. A reception side detects a pattern of the multiplexed symbol in pattern detecting section 113 as detecting a long code identification short code to acquire a long code phase. Based on the long code phase, a long code included in a long code group is searched.

19 Claims, 14 Drawing Sheets

CDMA RADIO COMMUNICATION APPARATUS

BACKGROUND OF THE INVENTION

1. Field of the Invention

The present invention relates to a CDMA asynchronous cellular radio communication system, particularly a COMA radio communication apparatus for identifying a long code used in a base station.

2. Description of the Related Art

In a CDMA asynchronous cellular radio communication system using a mobile terminal device such as a portable telephone and a car telephone, it is necessary to perform a cell search for the initial synchronization (acquisition) when a mobile terminal device is turned on or for a cell switching as moving (handover).

In forward link control channel signals, a common short code to each cell and a different long code for each base station are used, and the long code has masked intervals in it. The cell search is performed by detecting the correlation of a masked symbol with a common short code in the long code masked interval to detect a timing and a sort of the long code.

In detail, in a CDMA asynchronous cellular mobile communication system, a transmission side (base station) uses a common short code to each cell (CSC) as a code for search (search code) and a long code group identification short code (GIC) corresponding to the group to which a long code for each cell belongs, and transmits a frame in which a symbol spread with CSC and a symbol spread with GIC are code multiplexed in a plurality of long code masking intervals in slots prepared at equal periods in a frame (for instance, each slot).

A reception side (mobile terminal device) first detects a timing of a slot using a common short code to each cell. Then it defines the candidates of long codes to search using a long code group identification short code, further specifies a long code specific to the cell from the candidates of long codes.

FIG. 1 is a block diagram illustrating a configuration of a conventional initial synchronization section in a radio communication apparatus (mobile terminal device) in a CDMA asynchronous cellular mobile communication system. A signal transmitted from a base station is received in a mobile terminal device as input signal 20. Input signal 20 is processed in matched filter 3 to detect the correlation with a common short code to all base stations generated in common short code generating section 1.

The output in matched filter 3 is converted into a power value in electric power converting section 4, and the power value is averaged in averaging section 5. The power value of the correlation necessary to average is stored in memory 2. In the prescribed period, the maximum value among the averaged power values is detected in maximum value detecting section 6, and a timing detected in masked symbol timing generating section 7 is a masked symbol timing.

On the other hand, input signal 20 is processed in correlator 8 to sequentially detect the correlation with a long code group indication short code sequentially generated in long code group indication short code generating section 12 at the masked symbol timing. Each of the outputs in correlator 8 is converted into a power value in electric power converting section 9, and the power values obtained in the prescribed period are integrated in integrating section 10. Next the maximum value among the integrated power values is detected in maximum value detecting section 11, and by using a long code group identification short code with the maximum value, a long code group is identified. In addition, the output in maximum value detecting section 11 is transmitted to long code timing controlling section 21.

And input signal 20 is processed in correlator 15 to detect the correlation with a long code and short code generated in long code/short code generating section 19. For a long code/short code generated in long code/short code generating section 19, a phase of the long code is varied in for instance, slot interval in long code timing controlling section. And the long code is sequentially selected from the long codes classified in the long code group identified as described previously.

The output in correlator 15 is converted into a power value in electric power converting section 16, and the power values obtained in the prescribed period are integrated in integrating section 17. Next threshold value deciding section 18 decides whether or not the integrated value exceeds the threshold value, then identifies the long code with the value exceeding the threshold as a long code of the base station, and identifies the timing of the slot as a phase of the long code. In other words, the correlation detection is processed by varying a phase corresponding to the number of slots while by varying a long code classified in the long code group until the integrated value of correlation of a common short code to all base stations exceeds the threshold value. Thus a cell search is performed.

In a conventional initial synchronization section, however, in a CDMA radio communication apparatus described above, in the process to identify a long code from a long code group, since a phase differs depending on the number of slots, it must be performed to detect a long code phase along with the identification of a sort of long code. Accordingly there has been the problem that the problem it takes much time to acquire the identification of a long code, e.g., the initial acquisition. On the other hand, in the case of processing the long code identification in parallel in the hardware, the long code identification time can be reduced. However it brings the problem that the large scale of hardware is necessary.

SUMMARY OF THE INVENTION

The object of the present invention is to provide a CDMA radio communication apparatus capable of largely reducing the long code identification time without increasing the hardware scale.

This object is achieved by a CDMA radio communication apparatus for detecting a timing of a long code as detecting a long code group identification short code, or detecting a timing of a long code using a data pattern spread with a common short code to all base stations or a data pattern spread with a long code identification short code.

DETAILED DESCRIPTION OF THE PREFERRED EMBODIMENT

The present inventor was interested in the pattern of the correlation power value and the spread data pattern in a reception side, found that these patterns are useful to detect a long code phase and achieved the present invention.

Detail explanations are given to the embodiments of the present invention with reference to the attached drawings in the following. In addition, in the embodiments below, the explanations relate to a CDMA asynchronous cellular radio communication system.

(First Embodiment)

In the embodiment of the present invention, an explanation is given to a CDMA mobile communication system in which a long code phase is detected using a multiplexed pattern of masked symbols spread with two short codes.

Figure 1:
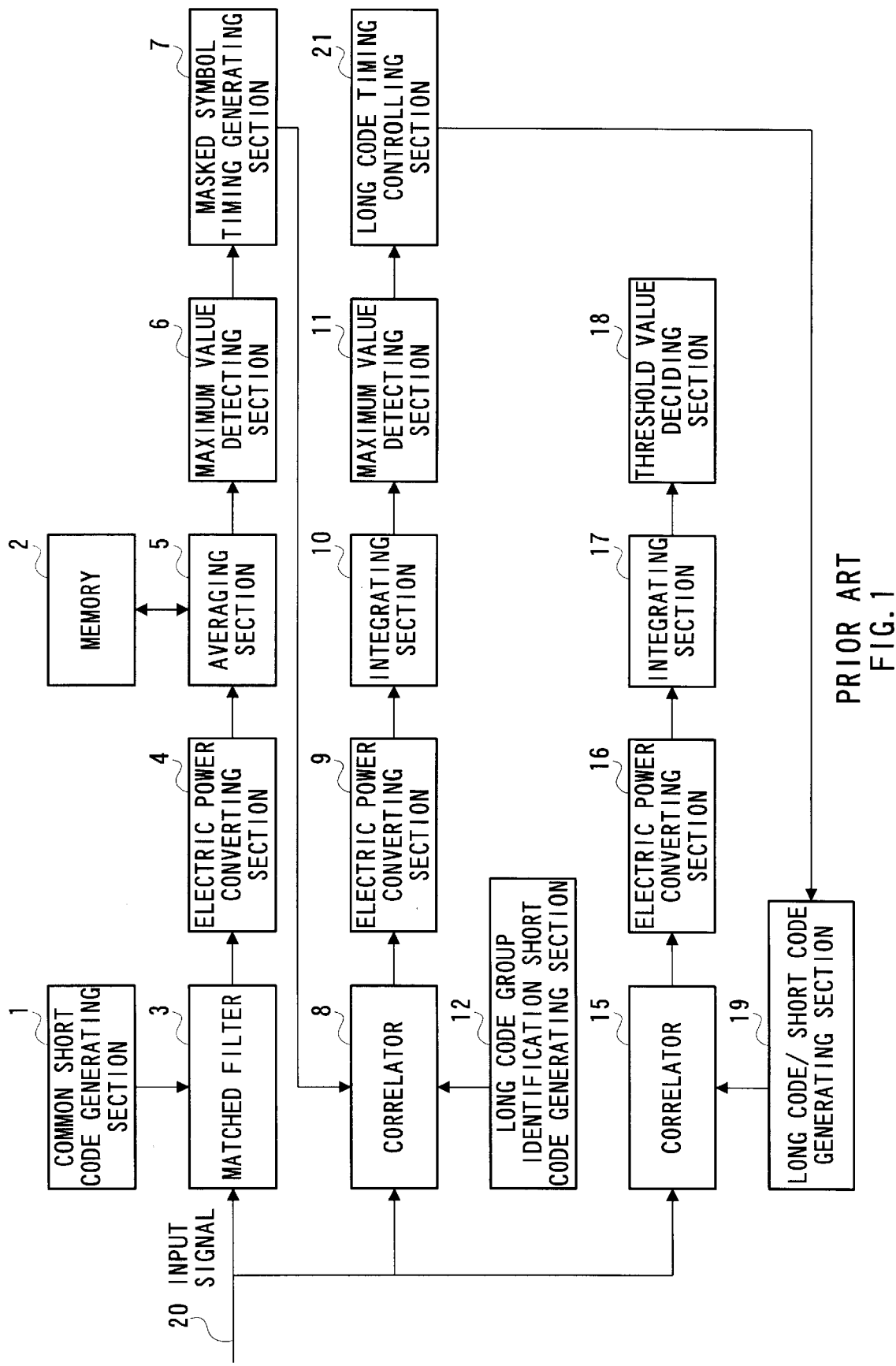
FIG. 1 is a block diagram illustrating a configuration of a conventional initial synchronization section in a CDMA radio communication apparatus.
Figure 2:
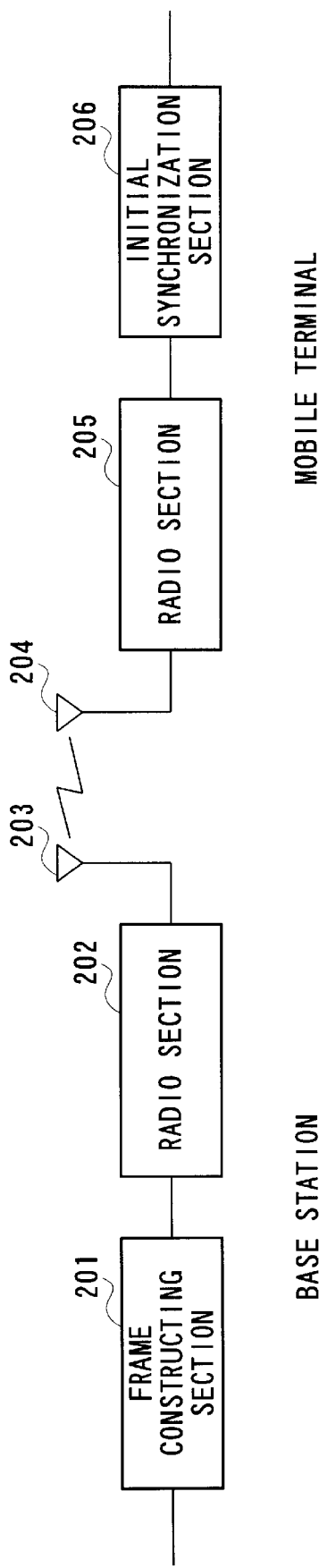
FIG. 2 is block diagram illustrating a schematic configuration of CDMA radio communication system in the first embodiment of the present invention.

FIG. 2 is block diagram illustrating a schematic configuration of CDMA radio communication system. In this system, in a base station side, a transmission signal is constructed in a frame according to the prescribed frame format in frame constructing section 201, and transmitted from antenna 203 via radio section 202. On the other hand, in a mobile terminal device side, a signals is received at antenna 204 and transmitted to initial synchronization section 206 via radio section 205. In addition, in FIG. 2, the processing sections featured by CDMA in the base station and mobile terminal device of the present invention are the same as those in an ordinary CDMA system, and not illustrated.

Figure 3:
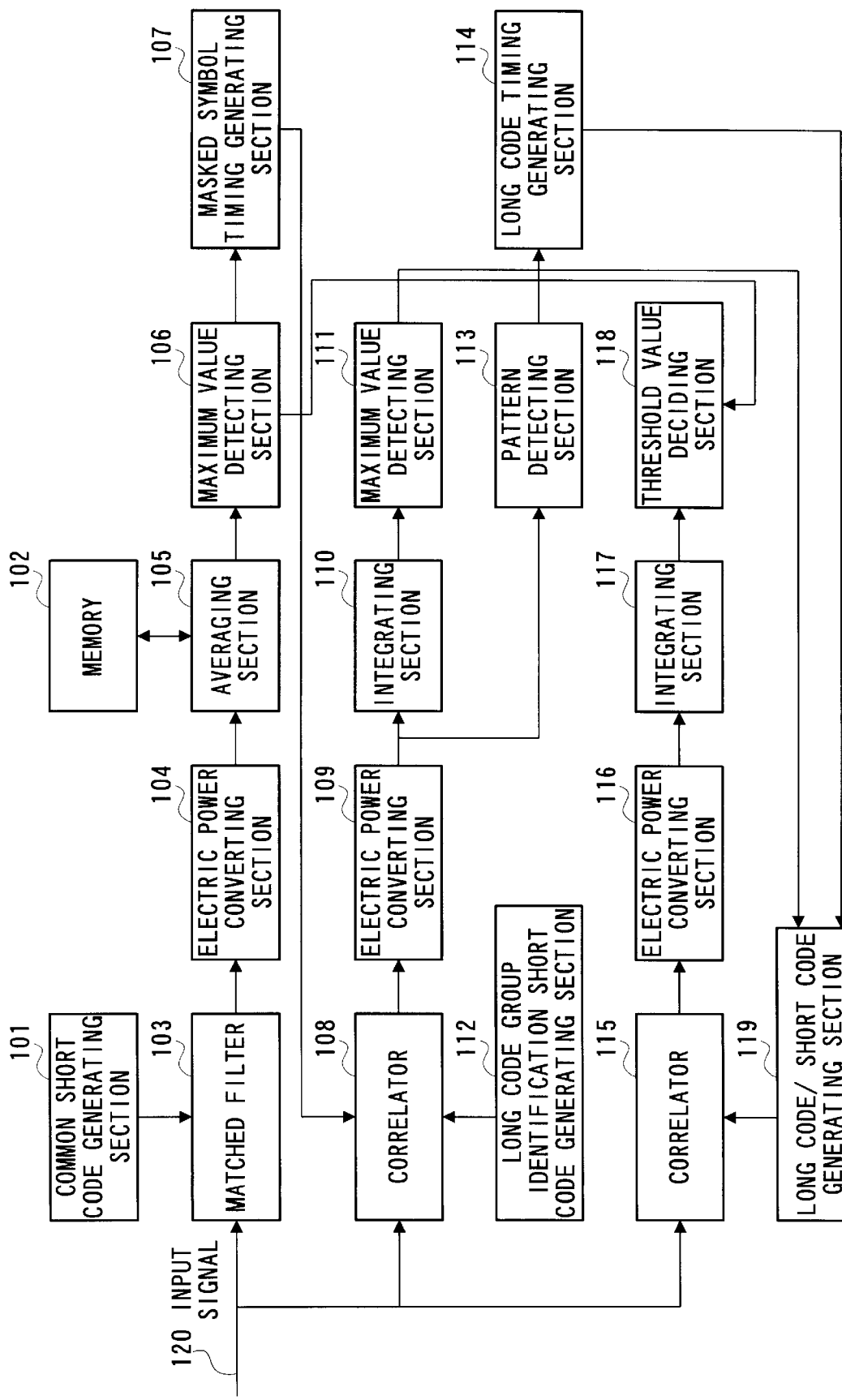
FIG. 3 is a block diagram illustrating an initial synchronization section in a CDMA radio communication apparatus in the first embodiment of the present invention.

FIG. 3 is a block diagram illustrating an initial synchronization section in a CDMA radio communication apparatus (mobile terminal device) in the first embodiment of the present invention. In FIG. 3, a signal transmitted from a base station is received in a mobile terminal device as input signal 120. Input signal 120 is processed in matched filter 103 to detect the correlation with a common short code to all base stations generated in common short code to all base stations generating section 101.

The output in matched filter 103 is converted into a power value in electric power converting section 104, and the power value is averaged in averaging section 105. The correlation power values the necessary to average, for instance, the data corresponding to the number of chips in a slot, are stored in memory 102. In the prescribed period, the maximum value among the averaged power values is detected in maximum value detecting section 106, and a timing detected in masked symbol timing generating section 107 is a masked symbol timing. As described above, the slot timing is detected, and concurrently the masked symbol time is detected. Thus, the masked symbol timing process is completed.

On the other hand, input signal 120 is processed in correlator 108 to detect the correlation with a long code group indication short code generated in long code group indication short code generating section 112 at the masked symbol timing described above. The output in correlator 108 is converted into a power value in electric power converting section 109, and the power values obtained in the prescribed period are integrated in integrating section 110. Next the maximum value among the integrated power values is detected in maximum value detecting section 111, and by using a long code group identification short code with the maximum value, a long code group is identified. In addition, the output in maximum value detecting section 111 is transmitted to long code timing/short code generating section 119.

The output in electric power converting section 109 is transmitted to pattern detecting section 113, a known pattern of masked symbols for a frame is detected, and a phase of a long code (for instance, head slot of a long code) is detected. The obtained result is transmitted to long code timing generating section 114, and a long code timing is determined in long code timing generating section 114. The determined long code timing is transmitted to long code/ short code generating section 119. Thus, the long code group identification process and the long code timing process are completed.

And input signal 120 is processed at the determined timing to detect the correlation with a long code/common short code to all base stations generated in long code/short code generating section 119. The output in correlation 115 is converted into a power value in electric power converting section 116, and the power values obtained during the prescribed period are integrated. Next in threshold value deciding section 118, along code with the maximum value, which is detected in maximum value detecting section 106, exceeding the threshold value is identified as a long code for the base station. Thus, the long code identification process is completed.

In addition, in the above configuration, a sliding correlator is available in stead of matched filter 103.

Figure 4:
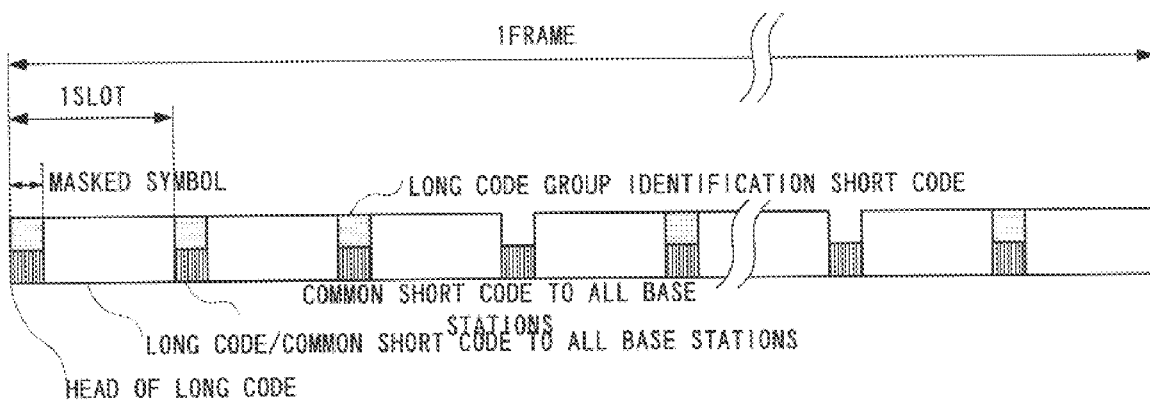
FIG. 4 is a diagram illustrating a frame format in a transmission side in the first embodiment of the present invention.

An explanation is given to an operation in an initial synchronization section in the CDMA radio communication apparatus configured as described above. First, in a transmission side (base station), a transmission signal is, as illustrated in FIG. 4, constructed into a frame where a masked symbol in a long code is prepared each slot at equal intervals. Herein an explanation is given to the case where a masked symbol is prepared at the head of a slot for the simplified explanation.

In a frame construction illustrated in FIG. 4, a long code is repeated in a frame period, and the head of a long code is the head of a frame. And in a masked symbol in this frame construction, the data spread with only a common short code to all base stations and the data spread with only a long code group identification short code are multiplexed. On the other hand, other symbols are spread twice with a common short code to all base stations and a long code specific to a base station. However, since data spread with only a long code group identification short code is multiplexed at the prescribed position in symbols spread with a common short code to all base station, at some positions in the symbols spread with a common short code to all base station, the data spread with only a long code group identification short code are not multiplexed. In addition, the prescribed position is already known for a base station and a mobile terminal device.

In a reception side (mobile terminal device), the cell search processing is executed in the order of the masked symbol timing detection, the long code group identification and the long code identification.

And, in the masked symbol timing detection process, the received data (input signal 120), is processed in matched filter 103 to detect the correlation with a common short code to all base stations, and the correlation is output at the chip rate. The output data of the correlation is converted into a power value in electric power converting section 104. The power value is stored in memory 102, and the power values stored in memory 102 of a polarity of slots are in averaging section 105 added and averaged by the predetermined number.

Figure 5:
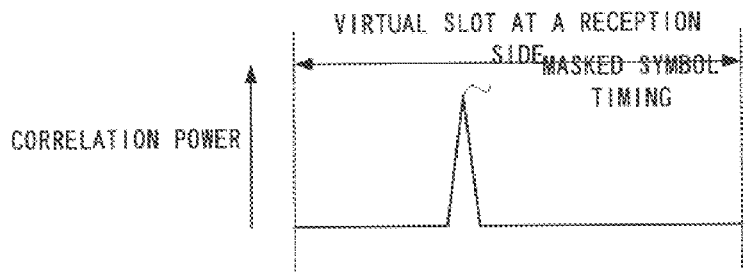
FIG. 5 is a diagram illustrating a correlation power value of a common short code to all base stations in the first embodiment of the present invention.

As illustrated in FIG. 5, the correlation (power value) has the maximum value at the position of a masked symbol. Accordingly the power value averaged in averaging section 105 has the maximum value also at the position of a masked symbol. Maximum value detecting section 106 detects this maximum value, and based on this maximum value, masked symbol timing generating section 107 detects a masked symbol timing, i.e., a slot timing.

Next in the long code group identification process, at the detected masked symbol timing, long code group identification short code generating section 112 generates all long code group identification short codes by varying a frame sequentially, and correlator 108 detects the correlation of each of these long code group identification short codes and a masked symbol in an input signal. Integrating section 110 integrates the correlation power values of the masked symbols in a frame and the long code group identification short code. Maximum value detecting section 111 identifies, from all long code group identification short codes, one with the maximum integrated value as a long code group identification short code for the base station.

At this time, the head slot of a frame is detected from a pattern of the correlation (power value) of the masked symbols in a frame. In a frame in a transmission side, the interval where a long code group identification short code is multiplexed with masked symbols has a pattern illustrated in FIG. 6. The multiplexed pattern in this example is "1111011110101100". In addition, FIG. 6 illustrates the condition where masked symbols are only extracted without other symbols.

Figure 6:
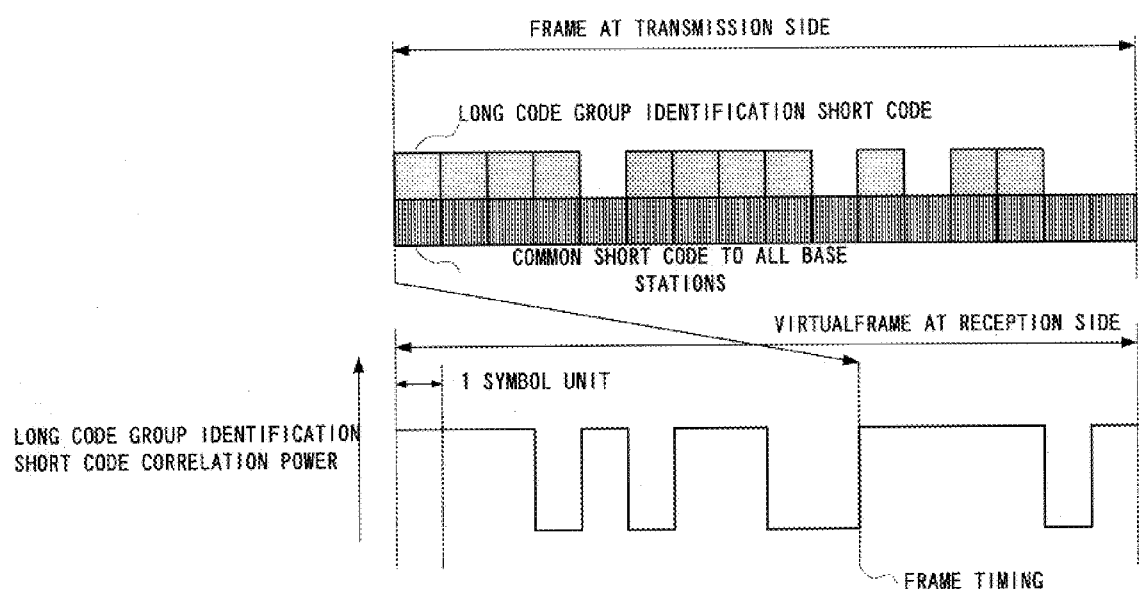
FIG. 6 is a diagram to explain a timing to detect a frame position using the correlation of a long code group identification short code in the first embodiment of the present invention.

In a reception side, the correlation power value of masked symbol and long code group identification short code in a frame has, as illustrated in FIG. 6, the higher value at the position where a symbol spread with long code group identification short code is multiplexed. This pattern is the same as that in the interval where a long code group identification short code is multiplexed in a frame in a transmission side in FIG. 6. Since it is possible to identify this pattern, by identifying the pattern in pattern detecting section 113, it is possible to detect a frame position, i.e., a long code phase. By using this long code phase, long code timing generating section 114 acquires a long code timing.

Next in the long code identification process, at the acquired long code timing, long code/common short code to all base stations generating section 119 generates a replica code of a long code/common short code to all base stations. At this time, a plurality of replica codes are generated using long codes in the identified long code group to vary a long code sequentially. And correlator 115 detects the correlation of the replica code and a symbol except masked symbols. Electric converting section 116 converts the correlation into a power value, and integrating section 117 integrates the power values of the predetermined number of symbols. Threshold value deciding section 118 identifies the long code with the integrated value exceeding the threshold value as a long code for the base station.

In a conventional method, in the long code identification process, it is necessary to detect a plurality of the correlations of a long code corresponding to the number of slots by shifting a phase according to a slot in a long code. On the other hand, according to the method of this embodiment, it is not necessary to detect a plurality of the correlations of a long code corresponding to the number of slots for a long code. Accordingly, when the number of slots is N, in the method of this embodiment, the long code identification process time is reduced to a Nth that of the conventional method.

Thus, according to the present invention, a transmission side transmits a frame in which long code masked symbols spread with a common short code to all base stations are multiplexed by masked symbols spread with a long code group identification short code in the predetermined pattern, and an initial synchronization section in a reception side, in the identification process of long code group identification short code, detects the pattern to detect a phase of a long code. For instance, the head position of a long code is detected. As a result, the initial synchronization acquisition time is largely reduced.

(Second Embodiment)

In this embodiment, an explanation is given to a CDMA radio communication apparatus for detecting a long code phase from the pattern data spread with a common short code to all base stations and/or a long code group identification short code.

Figure 7:
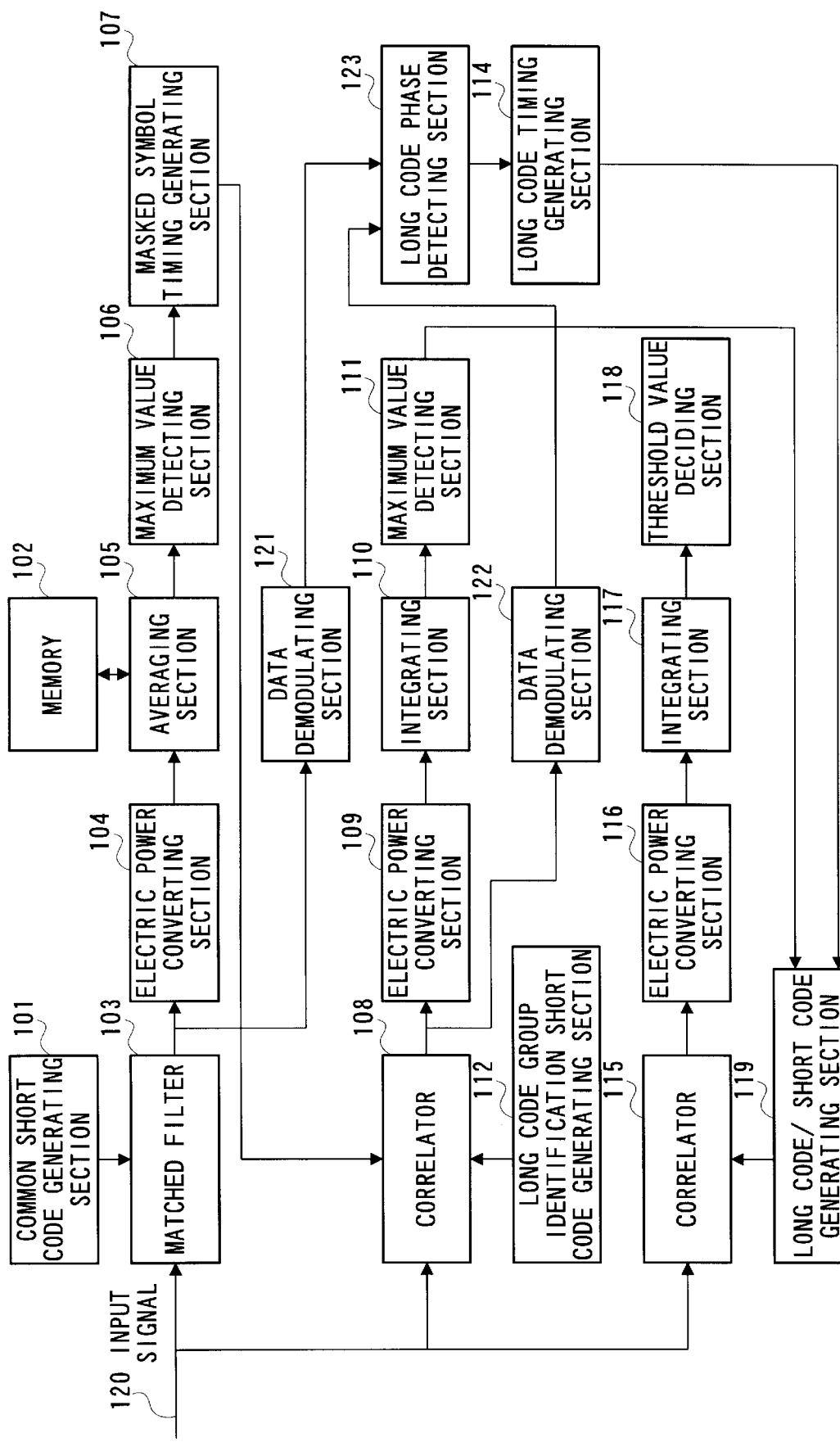
FIG. 7 is a block diagram illustrating a configuration of an initial synchronization section in a CDMA radio communication apparatus in the second embodiment of the present invention.

FIG. 7 is a block diagram illustrating a configuration of an initial synchronization section in a CDMA radio communication apparatus (mobile terminal device) in this embodiment. The same sections in FIG. 7 as those in FIG. 3 have the same symbols in those in FIG. 3 so that those explanations are omitted.

The output in matched filter 103 in the masked symbol timing detection process is transmitted to data demodulating section 121, and from the output, the data included in a masked symbol spread with a common short code to all base stations is extracted in demodulating section 121. The extracted data is transmitted to code phase detecting section 123.

The output in correlator 108 in the long code group identification process is transmitted to data demodulating section 122, and from the output, the data included in a masked symbol spread with a long code group identification short code is extracted. The extracted data is transmitted to long code phase detecting section 123.

In long code phase detecting section 123, a long code phase is detected using the both data from data demodulating section 121 and/or data demodulating section 122. This long code phase is transmitted to long code timing generating section 114. In addition, in the case of using the data of data demodulating section 122, the data demodulation is executed in data demodulating section 122 after the long code group identification short code is identified.

Figure 8:
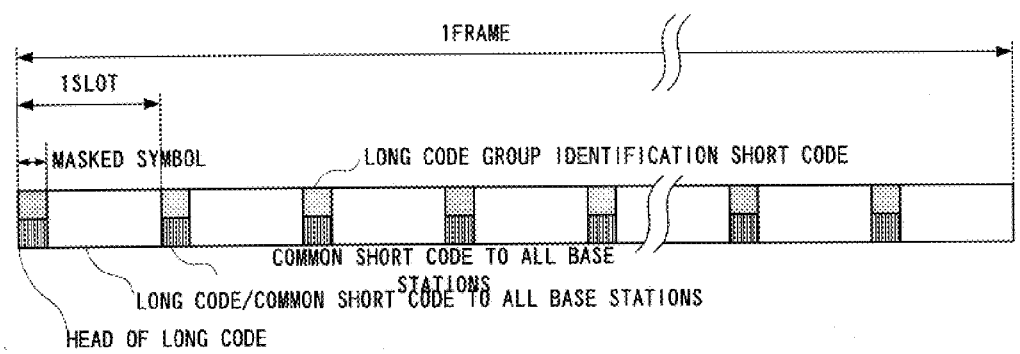
FIG. 8 is a diagram illustrating a frame format in a transmission side in the second embodiment of the present invention.

An explanation is given to an operation of an initial synchronization section in a CDMA radio communication apparatus with the above configuration. First a transmission side (base station) constructs a frame, as illustrated in FIG. 8, in which a masked symbol to partially mask a long code is prepared each slot at equal intervals in a long code. Herein, the case is explained where a masked symbol is prepared at the head of a slot for the simplified explanation.

In a frame construction illustrated in FIG. 8, a long code is repeated in a frame period, and the head of a long code is the head of a frame. And in the masked symbols in this frame construction, the data spread with only a common short code to all base stations and the data spread with only a long code group identification short code are multiplexed. On the other hand, other symbols are spread twice with a common short code to all base stations and a long code specific to a bases station.

At this time, the long code phase information is used as data to be spread with a common short code to all base stations and/or long code group identification short code. The long code phase information (pattern data) is included within a frame, and the same information is transmitted each frame.

In a reception side (mobile terminal device), the cell search processing is executed in the order of the masked symbol timing detection, the long code group identification and the long code identification.

First, in the masked symbol timing detection process, received data (input signal 120), is processed in matched filter 103 to detect the correlation with a common short code to all base stations, and the correlation is output at the chip rate. The output data of the correlation is converted into a power value in electric power converting section 104, and the power value is stored in memory 102. The power values stored in memory 102 of a polarity of slots are in averaging section 105 added and averaged by the predetermined number.

As illustrated in FIG. 5, the correlation (power value) has the maximum value at the position of a masked symbol. Accordingly the power value averaged in averaging section 105 has the maximum value also at the position of a masked symbol. Maximum value detecting section 106 detects this maximum value, and based on this maximum value, masked symbol timing generating section 107 detects a masked symbol timing, i.e., a slot timing.

And data demodulating section 121 data modulates the output of the correlation with a common short code to all base stations from matched filter 103 only for a masked symbol and extracts the data. In this case, if the transmitted data pattern is known in advance, a long code phase can be detected from the pattern phase by detecting the pattern of the extracted data. Thus, a long code timing is acquired.

Next in the long code group identification process, at the detected masked symbol timing, long code group identification short code generating section 112 generates all long code group identification short codes by varying, and correlator 108 detects the correlation of each of these long code group identification short codes and a masked symbols in an input signal. Integrating section 110 integrates the correlation power values of masked symbols and the long code group identification short code over the predetermined number of symbols. Maximum value detecting section 111 identifies, from all long code group identification short codes, one with the maximum integrated value as a long code group identification short code for the base station.

Next in the long code identification process, at the obtained long code timing, long code/common short code to all base stations generating section 119 generates a replica code of a long code/common short code to all base stations. At this time, a plurality of replica codes are generated using long codes in the identified long code group to vary a long code sequentially. And correlator 115 detects the correlation of the replica code and a symbol except masked symbols. Electric converting section 116 converts the correlation into a power value, and integrating section 117 integrates the power values of the predetermined number of symbols. Threshold value deciding section 118 compares the integrated value described above with the threshold value calculated from the maximum value of the correlation power value of common short code to all base stations detected in maximum value detecting section 106, and identifies the long code with the integrated value exceeding the threshold value as a long code for the base station.

In addition, in the above method, after the identification of long code group identification short code, data demodulating section 122 may extract the data spread with a long code group identification short code and, from the pattern, a long code phase can be detected.

Thus, according to this embodiment, a transmission side assigns the pattern data for the long code phase detection to a long code masked symbol in a frame, and spreads it with a common short code to all base stations and/or a long code identification short code to transmit. An initial synchronization section extracts the data pattern from the output in a matched filter and/or the output of the correlator for a long code group identification short code, and detects a long code phase from the pattern. As a result, since it is not necessary to detect the number of correlations corresponding to the number of slots in a long code, the initial synchronization acquisition time is largely reduced.

(Third Embodiment)

In this embodiment, an explanation is given to a CDMA radio communication apparatus in which the data of masked symbol is stored in a buffer memory and the correlation of the data and a long code group identification short code is processed in a slot in time division.

Figure 9:
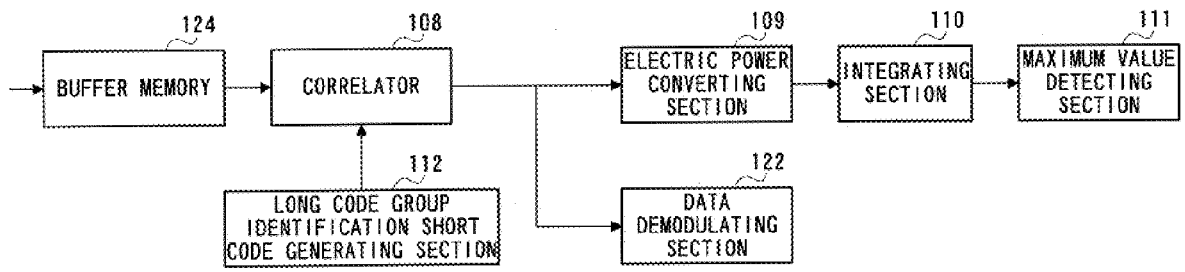
FIG. 9 is a block diagram illustrating a configuration of a long code group identification short code identifying section in the third embodiment of the present invention.

FIG. 9 is a block diagram illustrating a configuration of a long code group identification short code identifying section in this embodiment. The same sections in FIG. 9 as those in FIG. 7 have the same symbols in those in FIG. 7 so that those explanations are omitted. Buffer memory 124 illustrated in FIG. 9 is to store the data of masked symbols in input signal 120.

An explanation is given to an operation of a long code group identification short code identifying section with the configuration described above. Only the data of masked symbols in input signal 120 are stored in buffer memory 124. In this case, since the correlation of a masked symbol is processed with a long code group identification short code, one symbol time is enough for one long code group identification short code to process. And during the residual time in a slot time, the correlations of the contents in buffer memory 124 and other long code identification group short codes are sequentially processed in time division in a slot time.

Thus, according to this embodiment, since an initial synchronization section in a reception side stores the data of masked symbols in a buffer memory, and the correlations of long code group identification short codes are processed in time division in a slot time, the time to identify the long code group identification short code is largely reduced.

(Fourth Embodiment)

In this embodiment, an explanation is given to a CDMA radio communication apparatus for communicating a frame construction in which a masked symbol spread with a common short code to all base stations and a masked symbol spread with a long code group identification short code are prepared separately at different positions.

Figure 10:
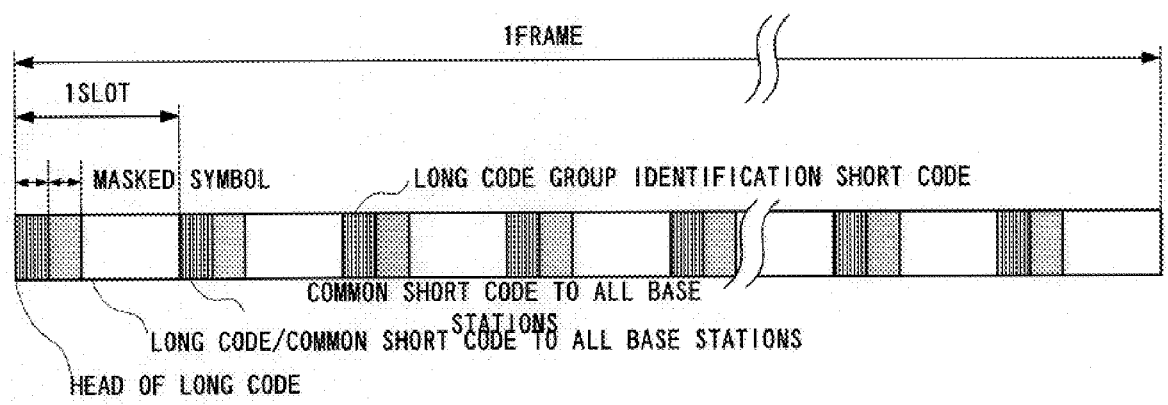
FIG. 10 is a diagram illustrating a frame format in a transmission side in the fourth embodiment of the present invention.

FIG. 10 is a diagram illustrating a frame format used in a radio communication in this embodiment. A transmission side generates in a frame constructing section a frame format illustrated in FIG. 10. In the frame construction, two masked symbols are prepared in a slot, where one is assigned a symbol spread with a common short code to all base stations, and another is assigned a symbol spread with a long code group identification short code. In FIG. 10, the two masked symbols are continuously prepared for the simplified explanation.

In the long code group identification process, a reception side detects the correlation of an input signal and a long code group identification short code at the position of a symbol after the masked symbol detected using the correlation of a common short code to all base stations in the timing detection process, and identifies a long code group identification short code.

In this embodiment, since two masked symbols are prepared separately in a frame, the correlation and the correlation power value become twice than the case where two masked symbols are multiplexed at a single position to transmit. That permits less influence by noise and fading. In addition, in this embodiment, although the explanation is given to the case where the masked symbol spread with a long code identification short code presents at the position of a symbol after the masked symbol spread with a common short code to all base stations, if the relationship of positions of the masked symbol spread with a long code identification short code and the masked symbol spread with a common short code to all base stations is predetermined in a frame format, i.e., patterned, the cell search is performed as well as the above case.

Thus, according to this embodiment, since a transmission side in a radio communication system transmits separately a masked symbol spread with a common short code to all base stations and a masked symbol spread with a long code group identification short code, the large correlation and the large correlation power value are acquired at an initial synchronization section in a reception side. As a result, in this system, the initial synchronization is certainly acquired in the condition resistant to noise and so on.

(Fifth Embodiment)

In this embodiment, an explanation is given to a CDMA radio communication apparatus for detecting a long code group and a long code phase from the pattern data spread with a common short code to all base stations.

Figure 11:
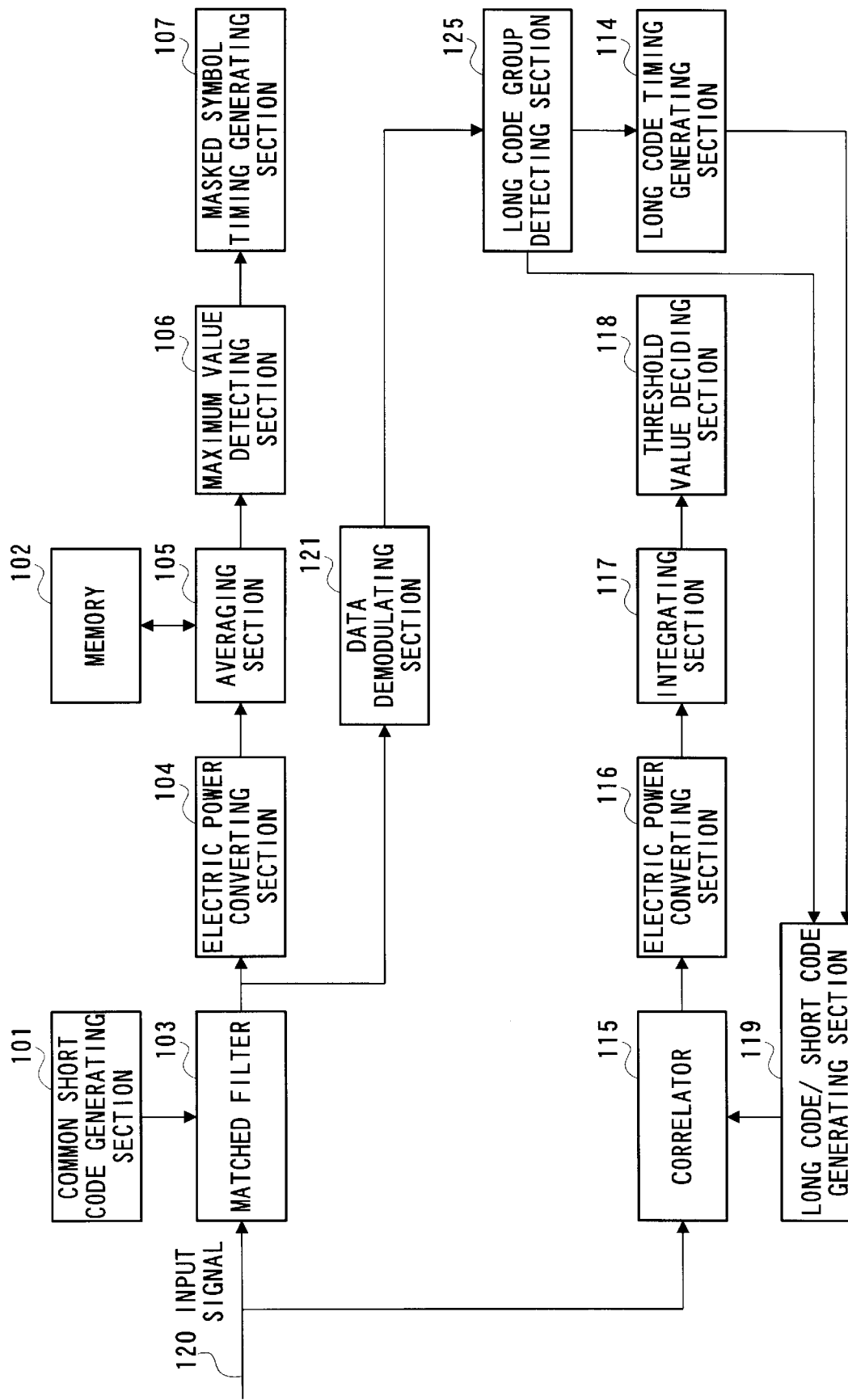
FIG. 11 is a block diagram illustrating an initial synchronization section in a CDMA radio communication apparatus in the fifth embodiment of the present invention.

FIG. 11 is a block diagram illustrating an initial synchronization section in a CDMA radio communication apparatus (mobile terminal device) in this embodiment. The same sections in FIG. 11 as those in FIG. 7 have the same symbols as those in FIG. 7 so that those explanations are omitted. The initial synchronization section illustrated in FIG. 11 has the same configuration as that in FIG. 7 except the sections concerning the long code group identification process. In other words, the initial synchronization section illustrated in FIG. 11 has the configuration where long code group detecting section 125 is prepared instead of long code group detecting section 123 without preparing correltor 108, electric converting section 109, integrating section 110, maximum value detecting section 111, long code group identification short code generating section 112 and data demodulating section 122 which are in the initial synchronization section illustrated in FIG. 7. Long code group detecting section 125 detects a long code group and a phase of a long code from the data demodulated from the output in matched filter 103 in data demodulating section 121.

Figure 12:
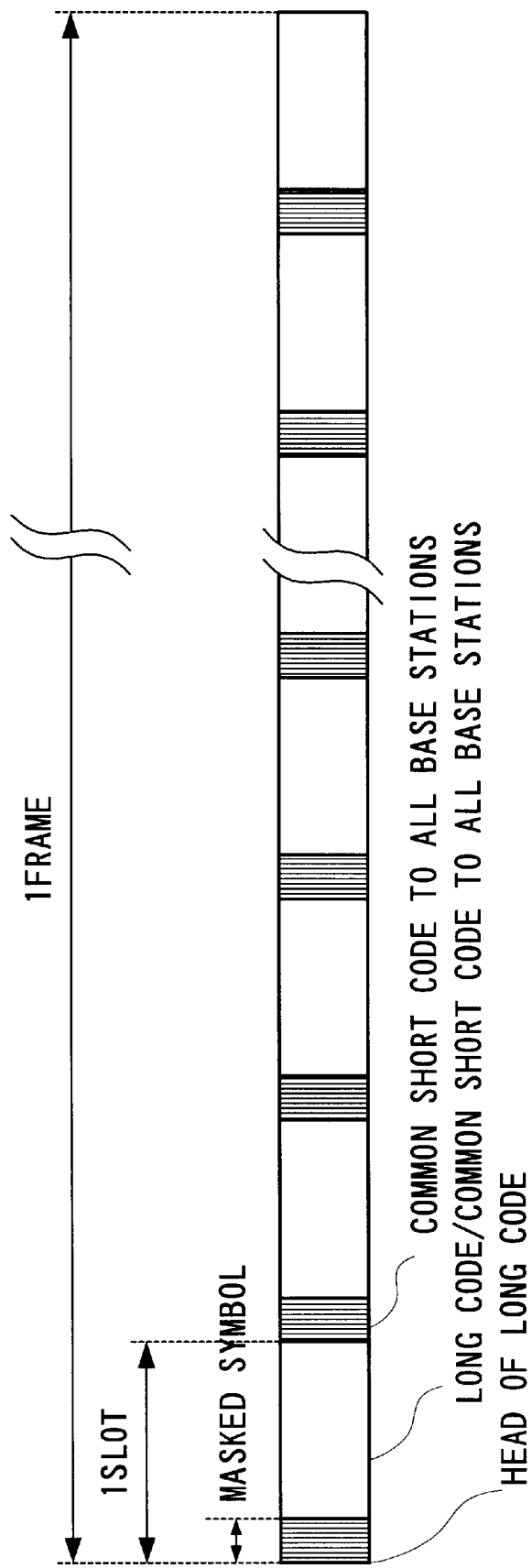
FIG. 12 is a diagram illustrating a frame format in a transmission side in the fifth embodiment of the present invention.

An explanation is given to an operation of an initial synchronization section in a CDMA radio communication apparatus with the configuration described above. First, in a transmission side, a transmission signal is, as illustrated in FIG. 12, constructed into a frame in which a masked symbol in a long code is prepared each slot at equal intervals. Herein an explanation is given to the case where a masked symbol is prepared at the head of a slot for the simplified explanation.

In a frame construction illustrated in FIG. 12, a long code is repeated in a frame period, and the head of a long code is the head of a frame. And in this frame construction, a masked symbol is the long code group identification data spread with only a common short code to all base stations. On the other hand, other symbols are spread twice with a common short code to all base stations and a long code specific to the base station. In addition, the long code group identification data are included within a frame, and repeatedly transmitted in each frame.

A reception side (mobile terminal device) detect the correlation, in the masked symbol timing detection process as well as the first embodiment, of input signal 102 and a common short code to all base stations in matched filter 103, and acquires a timing of a masked symbol from the correlation.

Next in the long code group identification process, data demodulating section 121 demodulates the data of the masked symbol from the output of correlation in matched filter 103, and extracts the pattern of long code group identification data. Next the extracted pattern of long code group identification data and the already known patterns of several sorts of long code group are compared to detect the matching. The matching one is used to identify a long code group and detect a long code phase. Thus, a long code timing is acquired.

Next in the long code identification process, at the acquired long code timing, long code/common short code to all base stations generating section 119 generates a replica code of a long code/common short code to all base stations. At this time, a plurality of replica codes are generated using long codes classified in the identified long code group to vary a long code sequentially. And correlator 115 detects the correlation of the replica code and a symbol except masked symbols. Electric converting section 116 converts the correlation into a power value, and integrating section 117 integrates the power values of the predetermined number of symbols. Threshold value deciding section 118 compares the integrated value described above with the threshold value calculated from the maximum value of the correlation power value of common short code to all base stations detected in maximum value detecting section 106, and identifies the long code with the integrated value exceeding the threshold value as a long code for the base station.

Thus, according to this embodiment, a transmission side transmits a long code masked symbol in which the pattern data to detect a long code group are spread with a common short code to all base stations, then a reception side extracts in an initial synchronization section the pattern data from the output in the matched filter and performs the identification of a long code group and the detection of a long code phase from the extracted data pattern. As a result, the initial synchronization acquisition time can be reduce largely, and the hardware scale can be reduced.

(Sixth Embodiment)

Figure 13:
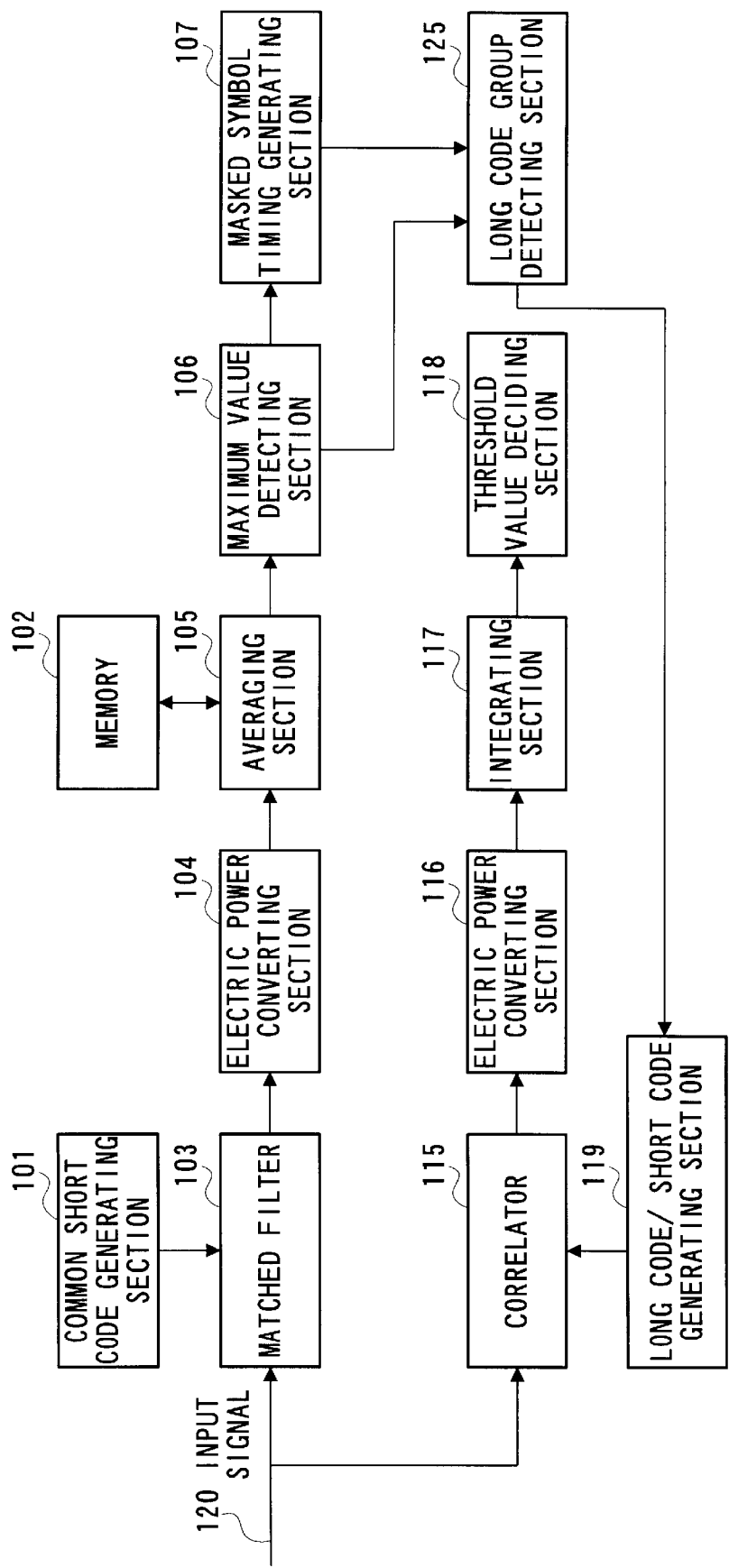
FIG. 13 is a block diagram illustrating an initial synchronization section in a CDMA radio communication apparatus in the sixth embodiment of the present invention.

In this embodiment, an explanation is given to a CDMA radio communication apparatus for identifying a long code group from the relationship of the positions of two masked symbols. FIG. 13 is a block diagram illustrating an initial synchronization section in a CDMA radio communication apparatus (mobile terminal device) in this embodiment. The same sections in FIG. 13 as those in FIG. 11 have the same symbols those in FIG. 11 so that those explanations are omitted. The initial synchronization section illustrated in FIG. 13 has the same configuration as that in the initial synchronization section illustrated in FIG. 11 except data demodulating 121 and long code timing generating section 114 which are eliminated. In this initial synchronization section, long code group detecting section 125 identifies a long code group from the output in maximum value detecting section 106, i.e., the maximum value of two common short codes to all base stations.

Figure 14:
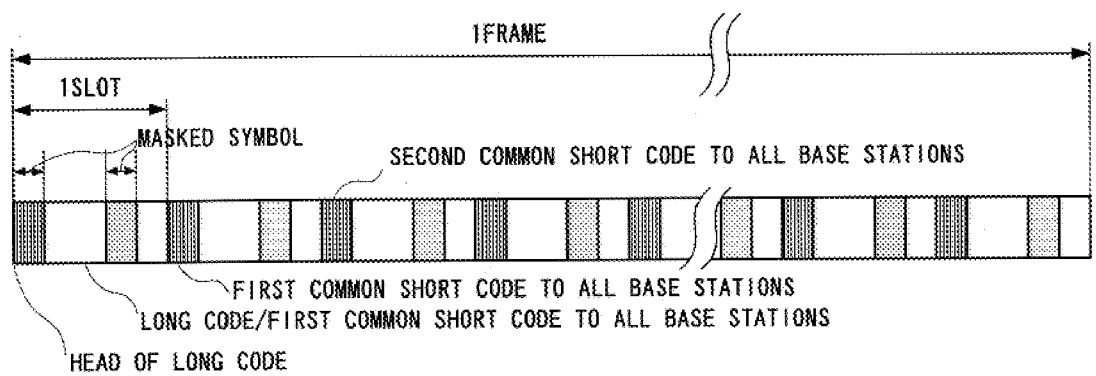
FIG. 14 is a diagram illustrating a frame format in a transmission side in the sixth embodiment of the present invention.

An explanation is given to an operation of an initial synchronization section of a CDMA radio communication apparatus with the configuration described above. A reception side constructs a frame, as illustrated in FIG. 14, in which two long code masked symbols are prepared in a slot. Herein, one masked symbol is prepared at the head of a slot and another one is prepared in a slot for the simplified explanation. In detail, a symbol spread with the first common short code to all base stations is assigned for a masked symbol at the head of the slot, and a symbol spread with the second common short code to all base stations is assigned for another masked symbol. In this case, the relationship of the positions of two masked symbols (patter) corresponds to a long code group. Accordingly, the long code group identification is performed by identifying the relationship of the positions of two masked symbols.

In a reception side (mobile terminal device), in the masked symbol timing detection process, input signal 120 is processed in matched filter 103 to detect the correlation with the first common short code to all base stations generated in common short code generating section 101. The correlation output data are converted into a power value in electric power converting section 104. The power value is stored in memory 102, and the power values stored in memory 102 of a polarity of slots are in averaging section 105 added and averaged by the predetermined number. Maximum value detecting section 106 detects the maximum value among the averaged correlation power values, and base on this maximum value, masked symbol timing generating section 107 detects a masked symbol timing, i.e., a slot timing.

Next in the long code group identification process, input signal 120 is processed in matched filter 103 to detect the correlation with the second common short code to all base stations generated in common short code generating section 101. The correlation output data are converted into a power value in electric power converting section 104. The power value is stored in memory 102, and the power values stored in memory 102 of a polarity of slots are in averaging section 105 added and averaged by the predetermined number. Maximum value detecting section 106 detects the maximum value among the averaged correlation power values. This maximum value and the slot timing detected previously are transmitted to long code group detecting section 125. Long code group detecting section 125 recognizes the relationship of the positions of masked symbols in a slot (the relationship of symbol position to obtain the maximum correlation in the slot) using the slot timing detected previously and the timing for the maximum value, and identifies a long code corresponding to the relationship of the positions.

Next in the long code identification process, an input signal is processed to detect the correlation with each of candidate long codes included in the identified long code group by varying a phase corresponding to the number of slots. And until threshold value deciding section 118 obtains the long code with the integrated correlation power value exceeding the threshold value, the correlation is processed sequentially by varying a long code from candidate long codes. The long code with the integrated value exceeding the threshold value is identified as a long code for the base station, and the slot timing is identified as a long code phase.

Thus, according to this embodiment, a transmission side transmits two masked symbols spread with common short codes to all base stations, and an initial synchronization section in a reception side detects a long code group from the relationship of the positions of two masked symbols without a long code group identification short code. That allows to downsize the hardware scale and reduce the initial synchronization acquisition time.

In this embodiment, although the explanation is given to the case where two masked symbols are prepared in a slot, more than three masked symbols can be prepared in a slot according to the present invention.

(Seventh Embodiment)

Figure 15:
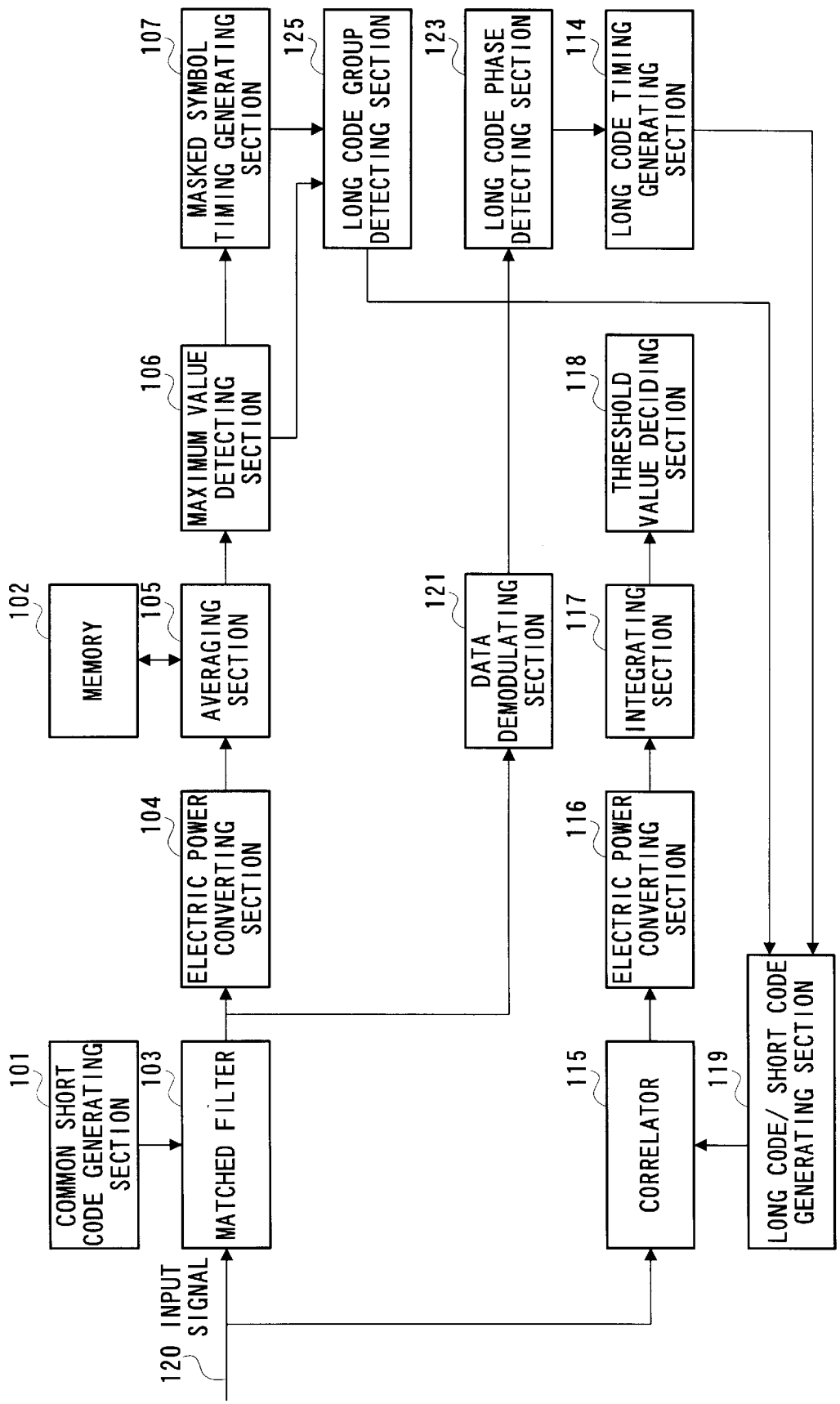
FIG. 15 is a block diagram illustrating an initial synchronization section in a CDMA radio communication apparatus in the seventh embodiment of the present invention.

In this embodiment, an explanation is given to a CDMA radio communication apparatus for detecting a long code phase using the long code phase information pattern. FIG. 15 is a block diagram illustrating an initial synchronization section in a CDMA radio communication apparatus (mobile terminal device) in this embodiment. The same sections in FIG. 15 as those in FIG. 11 have the same symbols as those in FIG. 11 so that those explanations are omitted. A CDMA communication apparatus illustrated in FIG. 15 detects in long code phase detecting section 123 a long code phase using the data extracted in data demodulating section 121.

An explanation is given to an operation of an initial synchronization section in a CDMA radio communication apparatus with the configuration described above. As illustrated in FIG. 14, a transmission side constructs a frame, as well as the sixth embodiment, in which two long code masked symbols are prepared in a slot. Herein one masked symbols is prepared at the head of a slot, and another one is prepared in a slot for the simplified explanation. In detail, a symbol spread with the first common short code to all base stations is assigned for a masked symbol at the head of the slot, and a symbol spread with the second common short code to all base stations is assigned for another masked symbol. In this case, the data to be spread with the first common short code or the second common short code to all base stations include the pattern for providing the long code phase information. And the relationship of the positions of two masked symbols (pattern) corresponds to a long code group. Accordingly, the long code group identification is performed by identifying the relationship of the positions of two masked symbols.

In a reception side (mobile terminal device), in the masked symbol timing detection process, input signal 120 is processed in matched filter 103 to detect the correlation with the first common short code to all base stations generated in common short code generating section 101. The correlation output data are converted into a power value in electric power converting section 104. The power value is stored in memory 102, and the power values stored in memory 102 of a polarity of slots are in averaging section 105 added and averaged by the predetermined number. Maximum value detecting section 106 detects the maximum value among the averaged correlation power values, and base on this maximum value, masked symbol timing generating section 107 detects a masked symbol timing, i.e., a slot timing.

Next in the long code group identification process, input signal 120 is processed in matched filter 103 to detect the correlation with the second common short code to all base stations generated in common short code generating section 101. The correlation output data are converted into a power value in electric power converting section 104. The power value is stored in memory 102, and the power values stored in memory 102 of a polarity of slots are in averaging section 105 added and averaged by the predetermined number. Maximum value detecting section 106 detects the maximum value among the averaged correlation power values. This maximum value and the slot timing detected previously are transmitted to long code group detecting section 125. Long code group detecting section 125 recognizes the relationship of the positions of masked symbols in a slot (the relationship of the symbol position to obtain the maximum correlation in the slot) using the slot timing detected previously and the timing for the maximum value and identifies a long code corresponding to the relationship of the positions.

And data demodulating section 121 demodulates the data of only masked symbols from the correlation outputs in matched filter 103, and extracts the data. Since the data has the known pattern for providing the long code phase information, a long code phase (the head slot in a frame) can be detected using the phase of the extracted data pattern.

Next in the long code identification process, an input signal is processed to detect the correlation with each of candidate long codes included in the identified long code group using the detected long code phase, the correlation power value is obtained, and the obtained correlation power values are integrated. And until threshold value deciding section 118 acquires the long code with the integrated correlation power value exceeding the threshold value, the correlation is processed sequentially by varying a long code from candidate long codes. The long code with the integrated value exceeding the threshold value is identified as a long code for the base station.

Thus, according to this embodiment, a transmission side transmits two masked symbols which are spread with common short codes to all base stations and include the long code phase information, and an initial synchronization section in a reception side detects a long code group from the relationship of the positions of two masked symbols without using a long code group identification short code, and detects the long code phase using the long phase information. That allows to downsize the hardware scale and reduce the initial synchronization acquisition time.

(Eighth Embodiment)

Figure 16:
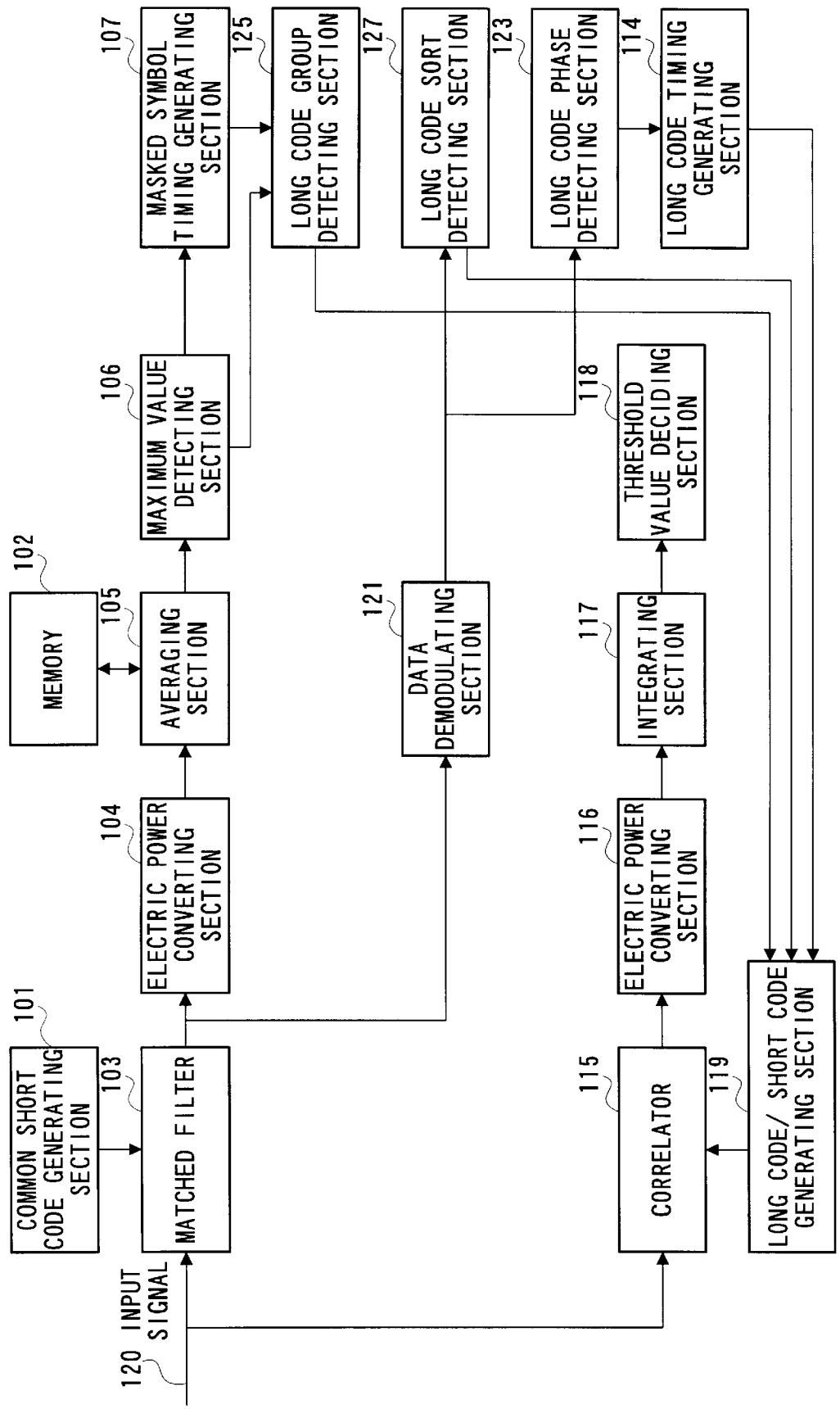
FIG. 16 is a block diagram illustrating an initial synchronization section in a CDMA radio communication apparatus in the eighth embodiment of the present invention.

In this embodiment, an explanation is given to a CDMA radio communication apparatus for acquiring a sort of long code using a pattern for providing a sort of long code and a long code group. FIG. 16 is a block diagram illustrating an initial synchronization section in a CDMA radio communication apparatus (mobile terminal device) in this embodiment. The same sections in FIG. 16 as those in FIG. 15 have the same symbols as those in FIG. 15 so that those explanations are omitted. In a CDMA radio communication apparatus illustrated in FIG. 16, long code sort detecting section 127 detects a sort of long code using the data extracted in data demodulating section 121. The sort of long code is transmitted to long code/short code generating section 119.

An explanation is given to an operation of an initial synchronization section in a CDMA radio communication apparatus with the configuration described above. As illustrated in FIG. 14, a transmission side constructs a frame, as well as the sixth embodiment, in which two long code masked symbols are prepared in a slot. Herein, one masked symbol is prepared at the head and another one is prepared in a slot for the simplified explanation. In detail, a symbol spread with the first common short code to all base stations is assigned for a masked symbol at the head of the slot, and a symbol spread with the second common short code to all base stations is assigned for another masked symbol. In this case, the data to be spread with the first common short code or the second common short code to all base stations include the pattern for providing a sort of long code. And the relationship of the positions of two masked symbols (pattern) corresponds to a long code group. Accordingly, the long code group identification is performed by identifying the relationship of the positions of two masked symbols.

A reception side detects, as well as the sixth embodiment, the slot timing using the first and the second common short codes to all base stations, and identifies the long code group using the relationship of the positions of two masked symbols in a slot. Concurrently data demodulating section 121 demodulates the data of only masked symbols from correlation outputs in matched filter 103 and extracts the pattern data. Long code phase detecting section 123 detects the sort of long code and the long code phase using the matching result of the pattern data. Thus, the long code identification, and the sort and phase of long code are acquired one time. In this case, it is preferable for the conformation to detect the correlation of an input signal with the identified long code, and executes the threshold decision in the same way as that in the embodiment described previously.

Thus, according to this embodiment, a transmission side transmits two masked symbols which are spread with common short codes to all base stations and include the long code sort information, and an initial synchronization section in a reception side demodulates the masked symbols without using a long code group identification short code, and detects a sort of long code and a long code phase. That allows to downsize the hardware scale and reduce the initial synchronization acquisition time.

In addition, in the first up to the eighth embodiments described above, although the explanations are given to the case where a CDMA radio communication apparatus is a mobile terminal device, the present invention is applied to the case where a CDMA radio communication apparatus is not a mobile terminal device but a communication terminal.

In the first up to the eighth embodiments described above, although the explanations are given to the case where a masked symbol locates at the head of a slot in a frame, the present invention provides the same effect in the case where a masked symbol presents anyway in a slot in a frame.

And the present invention is not limited to the first up to the eighth embodiments described above, which variations are available to practice. In addition, it is possible to properly combine the first up to the eighth embodiments described above to practice.

In the present invention as described above, the masked position (masking interval), where a masked symbol spread with a long code group identification short code and another masked symbol spread with a common short code to all base stations are multiplexed, is patterned, and as detecting a long code group identification short code, the pattern is detected to acquire a long code phase. That allows to reduce the long code identification time largely without increasing the hardware scale.

And in the present invention, the long code phase information or the long code group information is used as the data of a masked symbol. Because of it, the long code identification time can be reduced drastically. Further in the present invention, the long code group is identified from the relationship of the positions of a plurality of masked symbols in a slot using a plurality of common short codes to all base stations. That allows to reduce the long code identification time drastically.

What is claimed is:

1. A CDMA radio communication apparatus, comprising:
    a first detector that detects a timing of a masked symbol used in a cell search using long code masking;
    a first identifier that identifies a long code group at a detected timing;
    a second detector that detects a long phase using pattern data concerning a masked symbol; and
    a second identifier that identifies a long code using said identified long code group.

2. The CDMA radio communication apparatus of claim 1, wherein said pattern data comprises correlation pattern data.

3. The CDMA radio communication apparatus of claim 1, wherein said pattern data comprises pattern data of long code phase information spread in said masked symbol.

4. The CDMA radio communication apparatus of claim 1, wherein said masked symbol comprises a multiplexed symbol of a symbol spread with a different short code.

5. A CDMA radio communication apparatus, comprising:
    a detecting device that detects a timing of a masked symbol used in a cell search using long code masking; and
    an identifying device that identifies a long code by detecting a long code phase using pattern data concerning said masked symbol.

6. The CDMA radio communication apparatus of claim 5, wherein said data pattern comprises pattern data of a position in a slot where a symbol spread with a different short code is present.

7. A CDMA radio communication apparatus, comprising:
    a detector that detects a timing of a masked symbol used in a cell search using long code masking; and
    a detector that detects a long code phase and a sort of a long code, while identifying a long code group using pattern data concerning said masked symbol.

8. A CDMA radio communication apparatus, comprising:
    means for detecting a timing of a masked symbol used in a cell search using long code masking;
    means for identifying a long code group at said detected timing;
    means for detecting a long code phase in said identified long code group; and
    means for identifying a long code using said identified long code group,
    wherein said means for identifying a long code group includes a memory that stores masked symbol data.

9. A CDMA radio communication apparatus, comprising:
    means for detecting a long code phase using a positional relationship of masked symbols used in a cell search using long code masking; and
    means for identifying a long code using an identified long code group, wherein each of a plurality of masked symbols are each spread with a different short code present at a different position in a slot.

10. A CDMA radio communication system, comprising:
    a transmitting device that prepares a first masked symbol spread in a long code with only a short code common to all base stations at an equal interval in a slot, and multiplexing a second masked symbol in a long code spread with only a long code group identifying a short code in said first masked symbol, according to a predetermined pattern to transmit;
    a first acquiring device that acquires a first correlation by detecting a correlation of a received signal and said common short code to all base stations;
    a detector that detects a timing of said first masked symbol by detecting a maximum value of said first correlation;
    a second acquiring device that acquires a second correlation by detecting a correlation of said second masked symbol and each of candidates of long code group identification short codes sequentially;
    a third acquiring device that acquires a long code group by identifying a candidate with a maximum value of said second correlation as a long code group identification short code, while acquiring a long code phase by detecting a head position of a long code using a correlation pattern of said second masked symbol and said long code group identification short code;
    a fourth acquiring device that acquires a third correlation by detecting a correlation of a received signal and a long code included in said long code group using said long code phase; and
    an identifying device that identifies a long code corresponding to said third correlation exceeding a threshold value calculated from said maximum value of said first correlation as a long code for a base station transmitting said received signal.

11. A CDMA radio communication system, comprising:
    a transmitter that prepares a first masked symbol in a long code spread with a common short code to all base stations at an equal interval in a slot, and prepares a second masked symbol in a long code spread with a long code group identification short code at a position of a prescribed number of symbols after said first masked symbol according to a predetermined pattern to transmit;
    a first acquiring device that acquires a first correlation by detecting a correlation of a received signal and said common short code to all base stations;

a detector that detects a timing of said first masked symbol by detecting a maximum value of said first correlation;

a second acquiring device that acquires a second correlation by sequentially detecting a correlation of said second masked symbol and each candidate of long code group identification short codes;

a third acquiring device that acquires a long code group by identifying a candidate with a maximum second correlation as a long code group identification short code, while detecting a long code phase by detecting a head position of a long code using a correlation pattern of said second masked symbol and said long code group identification short code;

a fourth acquiring device that acquires a third correlation by detecting said correlation of said received signal and a long code included in said long code group using said long code phase; and an identifying device that identifies a long code corresponding to said third correlation exceeding a threshold value calculated from said maximum value of said first correlation as a long code for a base station transmitting said received signal.

12. The CDMA radio communication system according of claim 10, further comprising:

an assigning device that assigns long code phase information to said first masked symbol to spread with said common short code to all base stations;

a fifth acquiring device that acquires demodulated data by demodulating said first masked symbol with said common short code to all base stations; and a detecting device that detects a long code phase using a pattern of said demodulated data.

13. The CDMA radio communication system of claim 10, further comprising:

an assigning device that assigns long code phase information to said second masked symbol to spread with a long code group identification short code;

a fifth acquiring device that acquires demodulated data by demodulating said second masked symbol with said long code group identification short code; and a detecting device that detects a long code phase using a pattern of said demodulated data.

14. The CDMA radio communication system of claim 10, further comprising:

an assigning device that assigns long code phase information to said first masked symbol to spread with said common short code to all base stations, and assigns said long code phase information to said second masked symbol to spread with said long code identification short code;

a fifth acquiring device that acquires a first demodulated data by demodulating said first masked symbol with said common short code to all base station;

a sixth acquiring device that acquires a second demodulated data by demodulating said second masked symbol with said long code identification short code; and a detecting device that detects a long code phase using both of a pattern of said first demodulated data and a pattern of said second demodulated data.

15. The CDMA radio communication system of claim 10, further comprising:

a buffer memory that stores data of said second masked symbol; and a detecting device that detects said correlation of said second masked symbol stored in said buffer memory and said long code group identification short code in time division.

16. A CDMA radio communication system, comprising:

means for assigning a long code group identification data to a masked symbol in a long code to spread with a common short code to all base stations;

means for detecting a timing of said masked symbol using a maximum correlation of a received signal and said common short code to all base stations;

means for demodulating said masked symbol with said common short code to all base stations, capturing said long code group identification data from said masked symbol, and determining a long code group and a long code phase using a pattern of said long code group identification data; and means for sequentially detecting a correlation of said received signal and each of said long codes included in said long code group, and identifying a long code in which a correlation exceeds a threshold value calculated from said common short code to all base stations as a long code for a base station transmitting said received signal.

17. A CDMA radio communication system, comprising:

means for transmitting a frame, in which a first masked symbol in a long code spread with only a first common short code to all base stations and a second masked symbol in a long code spread with a second common short code to all base stations are prepared at different positions located at an equal interval in said frame;

means for detecting a correlation of a received signal and said first common short code to all base stations using one of a matched filter and a sliding correlator, and detecting a timing of said first masked symbol using a maximum correlation;

means for detecting said maximum correlation of said received signal and said second common short code to all base stations, and determining a long code group using a relationship of positions corresponding to said maximum correlation of each of said first common short code to all base stations and said second common short code to all base stations; and means for detecting said correlation of said received signal and each of candidates of said long code group by sequentially shifting a phase, and identifying a long code in which said correlation exceeds a threshold value obtained based on said correlation of said common short code to all base stations as a long code for a base station transmitting said received signal.

18. The CDMA radio communication system of claim 17, further comprising:

means for assigning long code phase information to said first masked symbol to be spread with only a first common short code to all base stations, and assigning long code phase information to said second masked symbol to be spread with only a second common short code to all base stations;

means for detecting a long code phase using the information demodulated from said first masked symbol and the information demodulated from said second masked symbol; and means for detecting a correlation of said received signal and each of candidates of said long code group using said long code phase sequentially, and identifying a long code with said correlation exceeding a threshold value obtained based on a correlation of said common short code to all base stations as a long code for a base station transmitting said received signal.

19. The CDMA radio communication system of claim 17, further comprising:

means for assigning long code sort information to said first masked symbol to be spread with only said first common short code to all base stations, and assigning said long code sort information to said second masked symbol to be spread with only said second common short code to all base stations;

means for demodulating said first masked symbol and said second masked symbol with said common short codes to all base stations, capturing said long code sort information, and determining a long code phase using a pattern of said long code sort information; and means for deciding a sort of long code using said long code group information and said long code sort information.

* * * * *

UNITED STATES PATENT AND TRADEMARK OFFICE
CERTIFICATE OF CORRECTION

PATENT NO.    : 6,370,134 B1              Page 1 of 1
DATED         : April 9, 2002
INVENTOR(S)   : Y. Aramaki It is certified that error appears in the above-identified patent and that said Letters Patent is hereby corrected as shown below:

<u>Column 15,</u>
Line 35, after "long" insert -- code --.

Signed and Sealed this

Seventeenth Day of December, 2002

JAMES E. ROGAN
*Director of the United States Patent and Trademark Office*